July 2, 1929.  O. C. DURYEA  1,719,105
CAR CONSTRUCTION
Filed Feb. 1, 1927   3 Sheets-Sheet 3
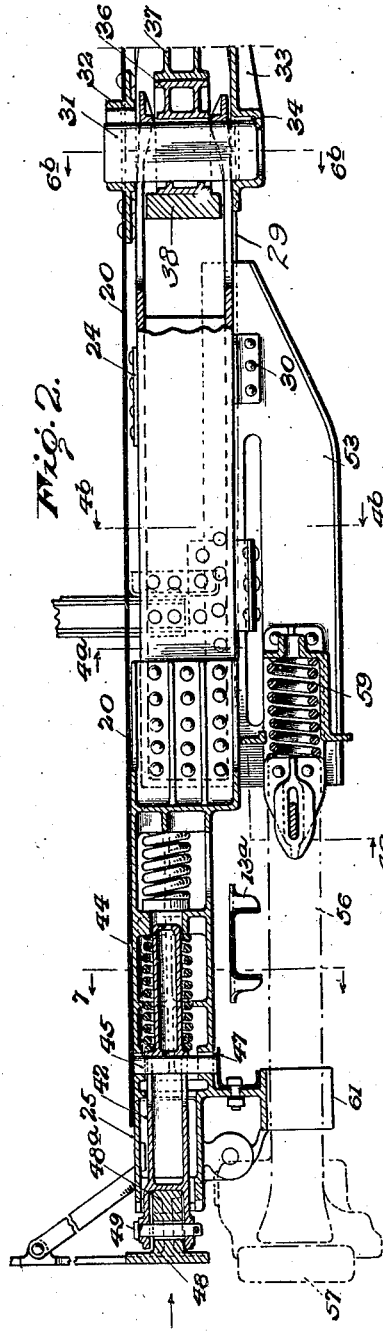
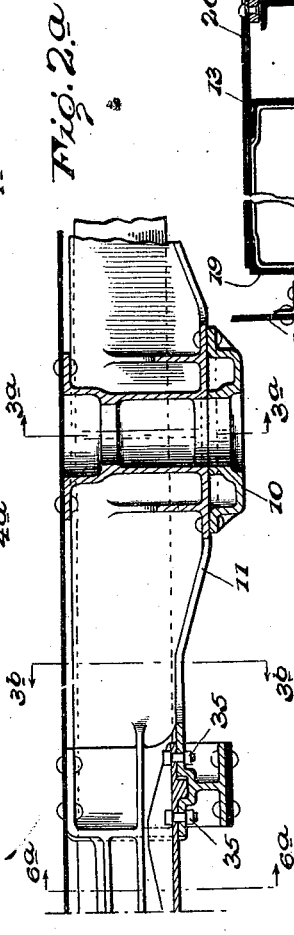
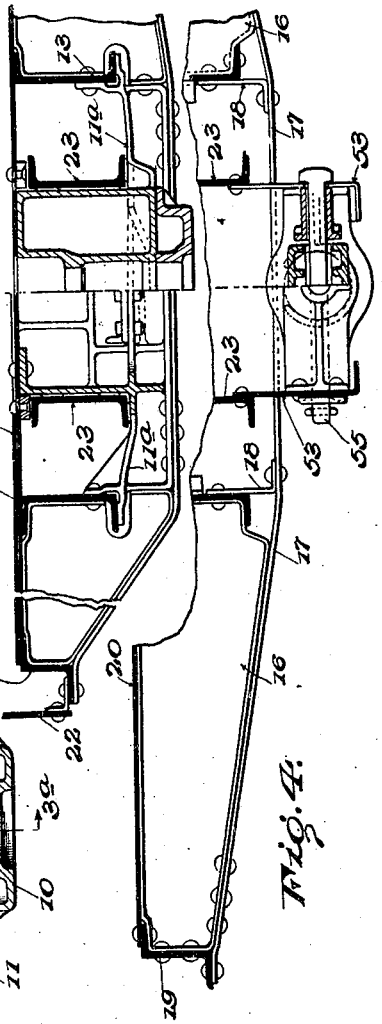
INVENTOR
Otho C. Duryea
By Mauro, Cameron, Lewis & Kerkam
ATTORNEYS Patented July 2, 1929.

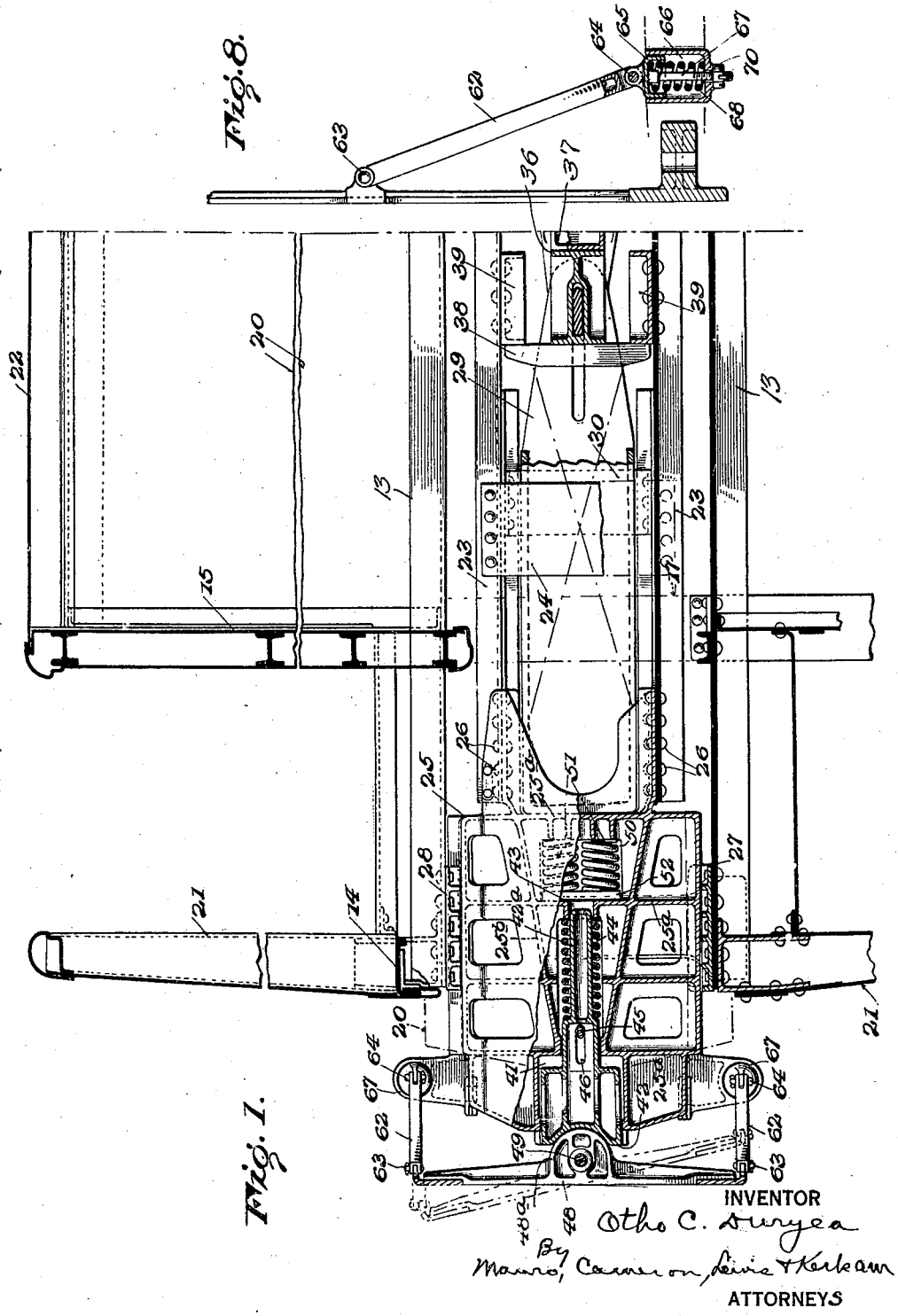

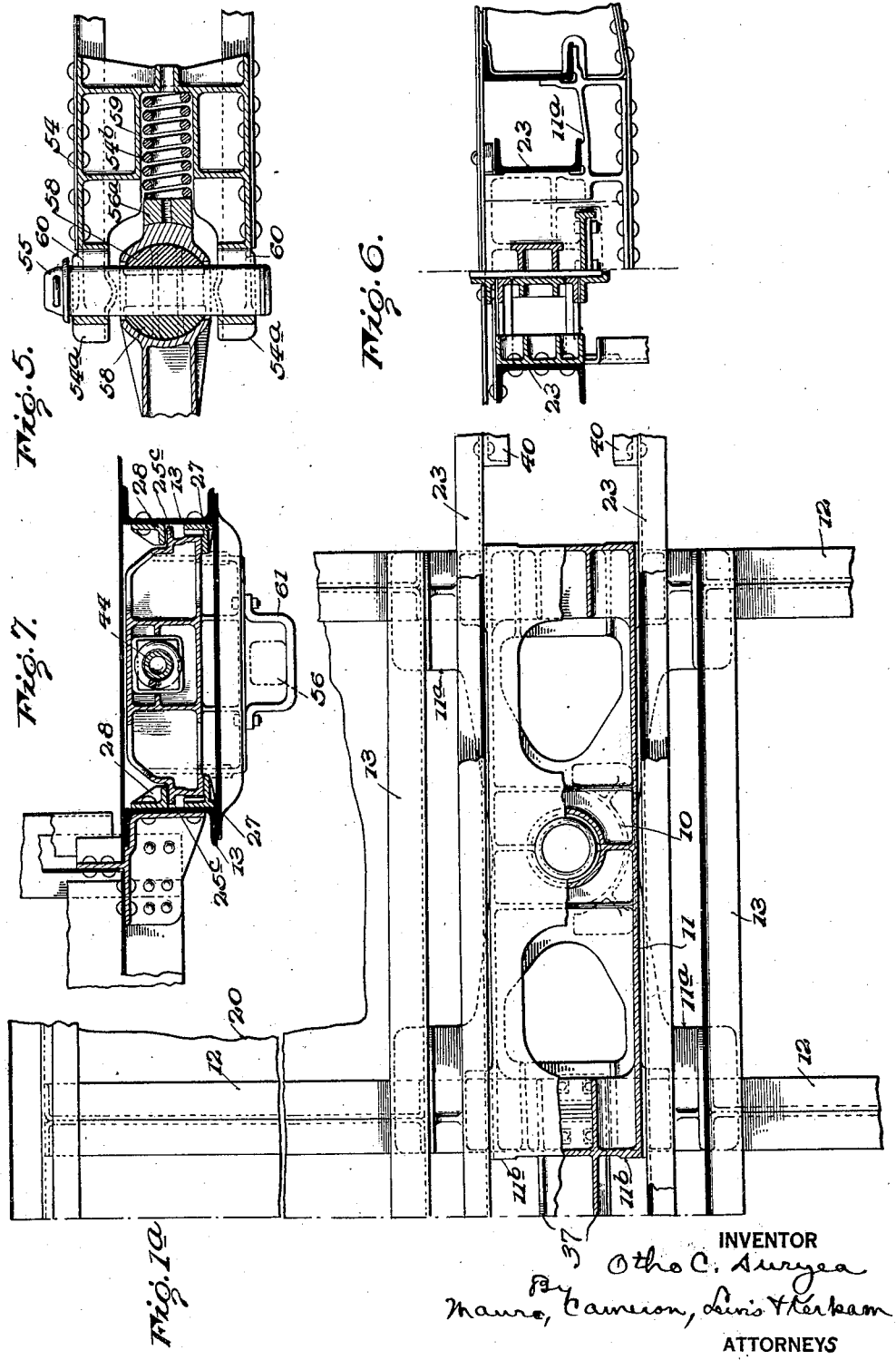

1,719,105

UNITED STATES PATENT OFFICE.

OTHO C. DURYEA, OF WATERBURY, CONNECTICUT, ASSIGNOR TO O. C. DURYEA CORPORATION, OF WILMINGTON, DELAWARE, A CORPORATION OF DELAWARE.

CAR CONSTRUCTION.

Application filed February 1, 1927. Serial No. 165,185.

This invention relates to railway cars and more particularly to cars of the passenger train type.

In passenger train cars, and particularly in passenger coaches, it has heretofore been customary to provide buffing means in the horizontal plane of the center sills and to associated therewith combined draft and buffing means located in a plane below the plane of the center sills, the couplers being operatively connected to this combined draft and buffing mechanism and hence also located in a plane below the center sills.

In my prior application Serial No. 105,291, filed April 28, 1926, there is disclosed a passenger train car embodying a long travel center member in combination with buffing means, said member and buffing means being located in the same horizontal plane, relative to the rails, as that heretofore employed for the usual center sills. In combination with the long travel center member are draft and buffing means, mounted in the lower horizontal plane of the couplers and operatively connected to the latter.

In my co-pending application Serial No. 116,695, filed June 17, 1926, there is disclosed a car of the passenger train type embodying a long travel center member which is located in the same horizontal plane as the couplers, said member and couplers thus being in a horizontal plane corresponding to the horizontal plane occupied by the couplers of the passenger train type of cars generally in use today. Draft and buffing means are provided in the same horizontal plane with said center member and couplers.

An object of the present invention is to provide a novel car structure of the type employed in passenger trains embodying a long travel center member.

Another object is to provide a novel car structure of this type wherein the center member is mounted in the same horizontal plane as that heretofore occupied by passenger car center sills, and to operatively connect to said center member draft and buffing mechanism positioned in this same horizontal plane, the couplers being mounted in a lower plane and operatively connected to the center member.

Another object of the invention is to provide novel means for operatively connecting the couplers to the center member whereby substantially all draft and buffing forces will be absorbed in the horizontal plane of said center member.

A further object is to provide a car which embodies novel means for insuring that no unresisted slack will be present between said car and the adjoining car of a train.

Another object is to provide a novel car structure of the passenger train type wherein the face plate, as for example, a face plate of a vestibule type of car, is operatively carried by the center member and is adapted for movement therewith.

A further object is to provide novel means for insuring that the face plate of the structure will at all times be maintained in engaged with the face plate of the adjoining car in the train, and this regardless of the long travel of the center member relative to the remainder of the car structure.

A further object is to provide novel means for operatively connecting the face plate with the center member.

Another object is to provide a novel structure of this type which shall embody, to a high degree, easy riding qualities, and which may be satisfactorily operated with other cars or coaches of the type now generally in use.

Other objects include the provision of novel means, constituting a buffing beam, that is preferably rigidly connected to the center member; to provide novel means for guiding the buffer member in its relative longitudinal movement; to provide novel means for yieldingly resisting relative movement between the face plate and the center member; and to provide novel means for facilitating the assembly of the structure. These and other objects will appear more fully hereinafter.

One form of the invention is illustrated in the accompanying drawings, but it is to be expressly understood that the drawings are for purposes of illustration only and are not designed as a definition of the limits of the invention, reference being had to the appended claims for this purpose.

In the drawings—

Figs. 1 and 1ª constitute a top plan view, in section, of one end of a car structure embodying the present invention, a portion of the structure being broken away to enable the use of a large scale drawing;

Figs. 2 and 2ª constitute a longitudinal sectional side view of the structure shown in Figs. 1 and 1ª;

Fig. 3 is a composite, transverse, sectional view, with parts broken away, the right half of the figure being taken on the line 3ª, 3ª of Fig. 2ª and the left half being taken on the line 3ᵇ, 3ᵇ of Fig. 2ª;

Fig. 4 is a composite, transverse, sectional view, with parts broken away, the right hand half of the figure being taken on the line 4ª, 4ª of Fig. 2, and the left hand half of the figure being taken on the line 4ᵇ, 4ᵇ of Fig. 2;

Fig. 5 is an enlarged detail view, in horizontal section, illustrating one manner in which the inner end of the coupler shank may be operatively connected to the draft cheek plates;

Fig. 6 is a composite, transverse, sectional view, with parts broken away, the right hand half of said figure being taken on the line 6ª, 6ª of Fig. 2ª, and the left hand portion of the figure being taken on the line 6ᵇ, 6ᵇ of Fig. 2;

Fig. 7 is a transverse, sectional, detail view, with parts broken away, taken on the line 7, 7 of Fig. 2; and Fig. 8 is an enlarged detail view, in side elevation and partly in section, illustrating one means which may be employed to yieldingly maintain a face plate in the desired operative positions.

Referring to the drawings, wherein like reference characters refer to like parts throughout the several views, the structure constituting the subject matter of the present invention is adapted to be mounted on trucks (not shown) of any suitable type, the illustrated embodiment being particularly adapted to be mounted on six-wheel trucks. Since the opposite ends of the structure are similar in construction and operation, the description will be limited to the one illustrated end only.

The structure is supported on the trucks by means of a center plate 10 (Figs. 1ª and 2ª) which is secured to, or a part of, the lower central portion of a center brace casting 11 which, together with transversely extending flange members 12, constitutes a double body bolster, the weight of the body structure being transferred through the member 12, and the casting 11, to the center plate 10 and thence to the trucks.

Rigidly secured in any suitable manner to the double body bolster and extending outwardly toward the end of the car, is a platform structure which may include sub-sills 13, one of the latter being provided on each side of the center brace member 11 and extending parallel thereto. The inner ends of the sub-sills 13, which latter are preferably constituted by vertically disposed channels which, as shown, terminate adjacent the inner end of the double body bolster, while the opposite ends of said sills extend outwardly, and are rigidly secured to the vestibule door posts 14, only one of which is shown in Fig. 1. Intermediate the posts 14 and the double body bolster, the channels 13 are rigidly secured to end sills 15 in any suitable manner, said end sills being constituted by diaphragms (Fig. 4) and a cover plate 17 secured to the lower portions of diaphragms 16, and extending beneath the sub-sills, said cover plate being directly connected to the sub-sills by clip angles 18. The upper flanges of the channels 13, constituting the sub-sills, are rigidly tied together, and to the side sills 19, by means of a platform cover plate 20, and the lower flanges of said channels 13 may be tied together at a plurality of points, if desired. A plate 13ª (Fig. 2) may be employed for this purpose, adjacent the outer ends of said channels, to coact with cover plate 17 and laterally extending portions 11ª (Fig. 3) formed integrally with, or secured to, casting 11. Extending outwardly from the channels 13 and vestibule door posts 14 are end extensions 21, said extensions being similar in construction and function to the members now generally referred to in the art as buffer beam extensions. The steps for the car (not shown) are provided intermediate the end extensions 21 (Fig. 1) and the end sills 15. The car sides 22 (Fig. 1) are suitably secured to the side sills 19.

The structure of the present invention embodies a center member, which is mounted for movement of large extent relative to the bolsters and platform structure. As illustrated, the center member is constituted by two vertically disposed channels 23 (Figs. 1, 1ª and 3) which preferably extend from a point intermediate the end extensions 21 and the end sill 15, at one end of the car, to a similar position at the opposite end of the car, said channels being secured together by any suitable number of tie plates 24, one of which is shown in Fig. 2. The inner faces of the webs of the channels 23 extend closely along the lateral faces of the center brace casting 11 of the body bolster and are guided in a horizontal plane by the same, the lower flanges of said channels 23 being adapted to slidably engage projecting portions 11ª (Fig. 6) of said casting. Suitable cross-bearers (not shown) are provided intermediate the body bolsters for guiding and supporting the center member.

A member 25, which constitutes a buffer beam, and which may be formed as a casting if desired, is rigidly secured, as by means of rivets 26, to the outer ends of the channels 23 constituting the center member. Preferably the lateral dimensions of this buffer beam are such that it extends outwardly beyond the channels 23, and its length is such that it extends outwardly beyond the end extensions 21. As shown more clearly in Fig. 1, the buffer beam 25 is provided with transverse strengthening ribs 25ª and diagonally-disposed strengthening ribs 25ᵇ, and the casting is suitably cored to avoid excessive weight.

Suitable members are provided on the sub-sills 13, adjacent the vertical plane of the end extensions 21, for guiding buffer beam 25 in its longitudinal movement with the center member 23, 23. As shown in Figs. 1 and 7, said guiding members are constituted by castings 27 which are rigidly secured to the sub-sills 13, and include horizontally disposed portions which extend underneath the buffer beam and slidably support the same. Longitudinally disposed castings 28, which are riveted to the inner faces of the webs of the sub-sills 13, extend above the lateral flanges 25$^c$ of the buffer beam, to prevent upward movement of the buffer beam relative to the sub-sills. The long travel center member may therefore be said to include the channels 23 and the buffer beam castings 25 at the opposite ends of the car.

Suitable means are provided for yieldingly resisting relative movement between the center member and the remainder of the car structure, such as the body bolsters and the end sills. Said means may be formed by energy absorbing mechanism, but preferably said means are constituted by energy dissipating mechanism, i. e., both springs and friction elements are preferably employed for resisting movement of the center member relative to the body bolsters. Said mechanism may be formed of various types of resilient and friction elements mounted at suitable positions to yieldingly resist relative movement of the center member in both directions, but in the form ilustrated in the drawings, said energy dissipating means are mounted in a housing 29, which housing also serves as a yoke, that has its outer end extending into engagement with the inner transverse rib 25$^a$ (Fig. 1) constituting the inner face of the rigid buffer beam 25. Due to the provision of a rigid buffer beam for transmitting buffing forces to the energy dissipating or buffing means, the present structure is not limited to the use of the relatively small buffing means heretofore employed for avoiding eccentrically applied forces.

Intermediate its ends, the housing 29 is supported by a strap 30 (Fig. 2) secured to the lower faces of the bottom flanges of the channels 23. Extending through vertically alined openings in the inner ends of the housing 29 is a vertically disposed key 31, which is held against movement in one direction at its upper end by means of a casting 32 that is rigidly secured, as by means of rivets, to the cover plate 20. The opening in casting 32 is preferably made larger than key 31 in order to facilitate assembly of the parts. The lower end of key 31 is held against movement by means of a casting 33 provided with a pocket 34 in which the lower end of the key rests, the inner end of said casting being secured, as by means of bolts or rivets 35, to the adjacent portion of the double body bolster. Surrounding the central portion of the key is a member 36 which abuts at its inner face against a projection 37 extending outwardly from the central portion of the outer face of the center base casting 11, while the opposite face of member 36 engages a follower plate 38 (Fig. 1) horizontally positioned between channels 23.

It will be understood that changes may be made in the means employed for transferring the cushioning effect of the mechanism contained within housing 29 to the body bolster and that the arrangement illustrated at 36, 37 is only one form which facilitates assembly of the parts.

Secured to the inner faces of the webs of the channel members 23, are suitable stops 39 (Fig. 1) which normally bear against the follower plate 38 and which are adapted to engage the adjacent face of the center brace casting 11 at the points 11$^b$, 11$^b$. Additional stops 40 are rigidly secured to channels 23 in such a position that normally said stops are at a distance from the inner face or end of the casting 11, equal to the distance of the stops 39 from the portions 11$^b$ of said casting.

A face plate of suitable type is operatively carried by the outer end of the center member, and is adapted for longitudinal movement with the latter. In the form shown, the buffer casting 25 is provided with a longitudinally extending pocket 41 (Fig. 1) into which slidably extends a center stem 42, provided, on the inner end thereof, with a reduced portion 42$^a$ which is adapted to slidably extend through an opening 43 formed in the inner web 25$^a$ of the buffer casting. A coil spring 44 surrounds the reduced portion 42$^a$ of buffer stem 42, the inner end of said spring having abutting engagement with a flange surrounding opening 43, and the outer end of said spring bearing against a collar suitably formed, or provided, on stem 42. Spring 44 tends to move stem 42 outwardly relatively to buffer casting 25, and this movement is limited by means of a vertically disposed pin 45 which extends through an elongated slot 46 formed in the stem 42. The key 45 is held against longitudinal movement since its opposite ends project loosely through suitable openings formed in the top and bottom portions of the buffer beam 25, and said pin may be retained in place by means of a member 47, secured in any suitable manner to the buffer beam, in a position to engage the lower end of said pin. Pivotally secured to the outer enlarged end of stem 42 is a face plate 48, the pivotal connection being formed, if desired, by a pin 49 which extends loosely through vertically alined openings in the upper and lower surfaces of buffer beam 25. The intermediate portion of said pin extends through a projection, or lug, 48$^a$ suitably provided on the inner face of plate 48. Preferably, the plate is so associated with stem 42 that no buffing force is placed directly on pin 49, and for this purpose the outer end of stem 42 may be provided with an arcuate pocket to receive lug 48$^a$, the latter being curved to conform to the curved surface of the pocket, as is clearly shown in Fig. 1. Intermediate the rib 25ª of the buffer beam, which is provided with the opening 43, and the inner rib 25ᵈ of said beam, is a pocket 50 in which are mounted resilient means, such as a pair of coil springs 51, and interposed between the outer ends of said springs 51 and the rib 25ª, is a follower plate 52 which is adapted to be engaged by the inner end of stem 42 in a manner to be pointed out more fully hereinafter.

Means are provided for transferring draft forces to the center member whereby said forces may be yieldingly resisted by the draft and buffing means contained in the housing 29. As shown, this draft means is mounted in a horizontal plane below the center member, said plane being at the same height above the rails as that occupied by the couplers employed on cars of the passenger train type in use today. In the form shown, said means are constituted by a pair of cheek plates 53 (Fig. 4) which are secured, along the upper edges thereof, to the inner faces of the webs of channels 23, and which project downwardly a suitable distance below said channels (Fig. 2). Riveted to the outer ends of the cheek plates and mounted between the same is a cheek plate casting 54 (Fig. 5) provided on the outer end thereof with a pair of horizontally extending apertured arms 54ª through which extends a coupled key 55. The key 55 also extends through the inner end of a coupler shank 56 which may be formed, if desired, in such a manner as to permit limited pivotal movement of the coupler head 57, relative to said key, in a horizontal plane, such movement of the coupler head being desirable when the car is being operated around a curve. In the form shown, the inner end of the coupler shank is provided with two segmental portions, one on each side of the key 55. Intermediate the curved surfaces of the segments and the adjacent side of the key, are segmental members, or castings, 58, 58, the curved faces of which engage the curved surfaces of the segmental portions of the coupler shank. The members 58, 58 are each provided with a groove in the straight face thereof, into which the adjacent edge of the key extends. The inner extremity of the coupler shank 56ª projects into a pocket 54ᵇ, formed in the cheek plate casting 54, and intermediate this extremity 56ª and the bottom of the pocket, is positioned a coil spring 59 which normally maintains the coupler in such a position that the key 55 is in contact with the outer walls of the slots of the elongated apertures 60 formed in the arms 54ª, with the coupler head in coupling position. The outer portion of the coupler shank is supported and guided by a suitable carrier iron 61, secured to a downwardly extending flange provided on the buffer beam 25. The carrier iron 61 is of such size as to permit free movement of the coupler shank in a horizontal plane when the car is being operated around curves.

If the structure of the present invention is to be embodied in a car of the vestibule type, means are provided to insure that the upper portion of the vestibule face plate will be maintained at all times in a proper position to coact with the face plate of the adjoining car of the train. In the form shown, said means are constituted by a pair of rods 62 (Fig. 8) which are pivotally connected in any desired manner, as at 63, to the opposite sides of the vestibule face plate at a suitable distance above the lower end thereof. The lower ends of said rods are pivotally connected respectively, by means of pins 64, to cup-shaped guides 65 which slidably extend into the upper ends of open pockets 66 formed one in each end of the laterally extending portions 67 (Fig. 1) of the buffer beam casting 25. Intermediate each guide 65 and the bottom of the pocket 66, is a coil spring 68 which surrounds an adjustable retaining member 69 that is suitably secured to, or integrally formed with, the guide, and which has the lower end thereof projecting through an opening in the bottom of pocket 66. A retaining member, such as a nut 70, is carried by the member 69 in position to engage the lower face of the bottom wall of pocket 66, and said nut thus acts as a stop to limit the movement of guiding member 65 and hence the rod 62.

As shown more clearly in Fig. 2, the pivotal connection between the lower end of the face plate and the buffer stem 42, is made with sufficient play to enable the rods 62 and springs 68 to maintain the face plate in the proper angular relation relative to the remainder of the structure. Since the face plate is adapted for pivotal movement about the vertically disposed pin 49, in order that it may maintain contact with the adjacent face plate of a coupled car when the same is being operated around a curve, the pivotal connection between rods 62 and the face plate, as at 63, must have sufficient play to permit the face plate to partake of this pivotal movement. It will be understood that a suitable toe-plate (not illustrated) is preferably provided between the face plate 48 and the cover plate 20.

*Operation.*—When coupling, the face plate of the coach or car to be coupled with my improved structure, will engage and move face plate 48, and will act through lug 48ª and stem 42 to compress the spring 44, which is sufficiently light to avoid any likelihood of the car being set in motion. Movement of the face plate 48 and stem 42 against the tension of spring 44 through a distance of approximately one inch, in the illustrated embodiment of the invention, relative to the buffer beam 25, will permit the coupler pulling faces to be brought into engagement whereupon the coupling is completed. Normally this will be done without any movement of the coupler head 57. Pin 45 does not interfere with the above mentioned relative movement of the stem 42 due to the length of the slot 46 provided in the latter. If my improved structure is embodied in a vestibule car, springs 68 and rods 62 may be so adjusted that the upper end of the vestibule face plate will normally be inclined outwardly, for example it may extend outwardly two inches beyond the lower end of said plate, and when coupling, the upper end of the vestibule face plate of the car to be coupled with the structure illustrated in the drawings, will first engage the upper end of face plate 48 and tilt the same to the right, as viewed in Fig. 2, against the tension of spring 68. As the coupling is completed, the upper end of the said face plate will move inwardly with the lower end thereof, so that the upper end of said vestibule face plate will have a total movement, in the example given, of approximately three inches relative to the center member. By this arrangement it will be seen that the upper ends of the face plates will be maintained in engagement at all times regardless of the irregularities in the track.

If a buffing force be applied to the improved structure constituting the subject matter of the present invention, said force is absorbed in the horizontal plane of the center member, since the spring 59 employed for normally maintaining the coupler head 57 in extended, coupling position is light relative to the draft and buffing mechanism carried by the housing 29, which latter mechanism is employed to resist the draft and buffing shocks. The spring 59 coacts with the resilient members 51 to permit limited, resisted movement of the face plate 48 and coupler head 57 relative to the center member, but these springs are of such size and strength that their principal function is not that of shock absorbing means, but to avoid unresisted slack between the cars of the train.

The buffing force tends to move, and if sufficiently great, does move the center member relative to the main body structure. Usually a buffing force is extremely violent and severe, and when applied to a car of the type generally in use today, said force is very disagreeable to the passengers, and may result in bodily injury. In order to absorb such a force without injury to the passengers or the car structure, the draft and buffing means of the present invention are adapted for long travel, whereby said force will be gradually and smoothly absorbed. The travel of said draft and buffing means is accordingly commensurate with the relative movement of the longitudinal center member. The train slack is independent of the movement of the center member and is maintained within predetermined limits, thereby securing the full benefits of the long travel draft and buffing means.

Moreover, if desired, the train slack may be made less than that considered standard heretofore. In the present structure the train slack is dependent upon the extent of movement of the face plate and the center stem 42, relative to the center member, after the cars are coupled.

A buffing force moves the buffing beam 25 to the right, as viewed in Figs. 1 and 2, relative to the body structure of the car, and this movement is transmitted through housing 29 to the buffing mechanism and the follower plate 38, and thence through member 36 and projection 37 directly to the body bolsters. The buffer beam, in its movement, carries along with it the center member 23, 23, coupler head 57, and stops 39, 39. Preferably, the movement of the center member relative to the body structure is materially greater than the travel of buffing mechanism heretofore employed in cars now in general use, in order that the buffing force may be smoothly resisted and absorbed or dissipated. It will be apparent that the buffing force applied to the structure of the present invention is absorbed in the horizontal plane of the center member and not in the horizontal plane of the coupler, as is the case with passenger cars heretofore used. One of the many advantages arising from such a structure will be readily apparent to those skilled in the art, namely, the tendency for one end of a car embodying the present invention to be lifted above the end of the underframe of an adjoining car, with resulting telescoping, is removed. It is to be understood that the draft and buffing mechanism at the opposite ends of the car is effective to yieldingly resist a buffing force applied to either end of the center member.

If a draft force be applied to the coupler tending to move the same to the left, as viewed in Figs. 1 and 2, this force is transmitted through coupler shank 56, key 55, cheek plate casting 54, and cheek plates 53, to the center member, whereby movement of the center member to the left, relative to the remainder of the car structure, is produced. This movement is yieldingly resisted by the draft and buffing mechanism, since the stops 39 engage the follower plate 38 and compress the elements of said mechanism, which elements are held against movement relative to the car body by means of key 31, the latter, in turn, being held against movement by plate 33 and cover plate casting 32. Due to the long travel of the center member, the draft forces are yieldingly resisted without shock or injury to the passengers and the car structure.

It will thus be perceived that there is provided a car structure of the long travel, center member type which is simple in construction, which is rugged, and which may be satisfactorily operated with cars provided with short travel, draft and buffing mechanism of the type heretofore employed. The buffing forces are absorbed in the horizontal plane of the center member, thereby avoiding any tendency of the cars to telescope. The train slack or relative movement between adjoining cars may be controlled as desired, and is entirely independent of the extent of travel of the draft and buffing, or cushioning, mechanism.

The face plate is carried by, and is movable with, the center member, and regardless of the extent of movement of said center member, relative to the car body, said face plate is always maintained in proper engagement with the face plate of the adjoining car. Means are provided for insuring that the face plates of cars of the vestibule type will always be maintained in proper engagement regardless of the irregularities of the track, and said face plates may pivot about vertical axes to provide for operation of the cars of a train around curves. The long travel movement of the center member cannot result in a gap or opening between cars and hence no injury will result to passengers who may be passing from one car to another at the time that an excessive draft or buffing force is imparted to the car or cars.

As previously pointed out, the buffing forces are absorbed in the horizontal plane of the center member independently of the couplers and it will now be seen that if the couplers should be rendered inoperative for any reason, such as by means of a sheared coupler key, etc., the safety chains secured to the eyes provided below the laterally extending portion 67 of the buffer beam 25, are effective to sustain all draft forces. All draft and buffing shocks will be effectively absorbed and transmitted, and derangement of the coupler means will not prevent satisfactory operation of the car. Otherwise stated, the loss of a coupler in no way interferes with the proper operation of the draft and buffing means. The use of yielding means intermediate the face plate and the center member insures against any unresisted train slack.

While only one embodiment of the invention has been illustrated and described, it is to be expressly understood that the invention is not limited thereto, since various changes may be made in the structural details without departing from the invention. For example, the draft and buffing mechanism, or cushioning means, for yieldingly resisting relative movement of the center member, may be formed of a variety of elements of the type now well known in the art. For example, the cushioning means may be constructed in a manner described in my co-pending application Serial No. 26,267, filed April 27, 1925, or the friction elements may be separated from the resilient elements, instead of being mounted in a single housing as in the illustrated embodiment. The platform structure, including the sub-sills, may be varied, as will be understood by those skilled in the art. Moreover, the invention is not limited to a buffer beam formed as a casting. If the car is not of the vestibule type, it will be seen that rods 62, and the elements associated therewith, are not essential. Reference will therefore be had to the appended claims for a definition of the limits of the invention.

What is claimed is:—

1. In a car of a class described, the combination with a body structure, of a center member mounted for longitudinal movement relative to said body structure, means for yieldingly resisting movement of the center member relative to said structure in both directions, couplers secured to the center member, and yielding means for receiving buffing forces and for transmitting the same to said center member independently of said couplers.

2. A car of the class described comprising, in combination with a body structure, a longitudinal center member mounted for movement relative to said body structure, draft and buffing means for resisting movement of the center member relative to said structure, couplers secured to said center member, and means including a face plate for receiving buffing forces and for transmitting the same to said center member independently of said couplers.

3. In a car of the class described, the combination with a body structure, of a center member mounted for longitudinal movement relative to said body structure, cushioning means for resisting movement of the center member relative to the said structure in both directions, couplers operatively secured to said center member, and means carried by the center member for receiving buffing forces and for transmitting the same to the center member independently of said couplers.

4. A car of the class described comprising, in combination with a body structure, a longitudinally extending center member mounted for movement relative to said body structure, draft and buffing means for resisting movement of the center member relative to the said structure, couplers mounted in a plane below the horizontal plane of the center member and secured to the latter, and means adapted for movement relative to the center member for receiving buffing forces and for transmitting the same to said center member independently of said couplers.

5. A car of the class described, comprising in combination with a body structure, a long travel center member extending the length of the car and mounted for longitudinal movement relative to said body structure, means for resisting movement of the center member relative to said structure, couplers operatively connected to said center member and adapted for movement relative thereto, and yielding means for receiving buffing forces and for transmitting said forces to said center member independently of said couplers.

6. A car of the class described comprising, in combination with a body structure, a center member mounted for longitudinal movement relative to said body structure, said center member extending the length of the body structure, means for yieldingly resisting movement of the center member relative to said structure in both directions, couplers operatively connected to said center member, and means including a face plate adapted for movement relative to said center member for receiving buffing forces and for transmitting said forces to said center member independently of said couplers.

7. In a car of the class described, the combination with a body structure, of a center member mounted for longitudinal movement relative to said body structure, cushioning means for resisting movement of the center member relative to said structure, couplers secured to said center member, and means for receiving buffing forces and for transmitting the same to said center member independently of said couplers.

8. In a car of the passenger train type, the combination with a body structure, of a center member extending the length of the structure and mounted for longitudinal movement in both directions relative to said structure, means for yieldingly resisting movement of the center member relative to said structure in both directions, couplers secured to said center member and mounted in a plane below the latter, and means including a face plate slidably mounted relative to said center member for securing resisted train slack between said car and the next adjoining car of a train.

9. In a car structure of the class described, a long travel center member, cushioning means for resisting movement of the center member relative to the bolsters of said structure, couplers secured to said center member, and slidable means carried by said center member for receiving buffing forces exerted on the structure and for transmitting the same directly to said center member independently of the couplers, said buffing forces being absorbed by said cushioning means.

10. In a passenger coach of the vestibule type, the combination with a body structure, of a center member mounted for longitudinal movement relative to said body structure, means for yieldingly resisting movement of the center member relative to said structure in both directions, a vestibule face plate carried by said center member, means including a pair of pivotally mounted rods for operatively connecting said face plate and center member, and couplers operatively connected to said center member.

11. In a car of the class described, the combination with a body structure, of a member extending the length of said structure and mounted for longitudinal movement relative thereto, coupler means operatively connected to said member, means for yieldingly resisting movement of the member in either direction relative to said structure, a vestibule face plate movably mounted on said center member, and yielding means for normally maintaining the upper portion of said plate in a predetermined position relative to said structure.

12. In a car of the type embodying a longitudinally movable center member extending substantially the length of the car body, the combination with said member of movable means carried thereby for confining substantially all buffing forces to the horizontal plane of said member, and couplers operatively connected to the center member.

13. A car of the passenger train type comprising, in combination, a center member extending substantially the length of the car, couplers operatively connected to said member, means including a plate adjacent the end of said member for transmitting approximately all buffing forces to the member, and means operatively connected to said member for yieldingly resisting said forces.

14. A railway car comprising a draft and buffing member extending substantially the length of the car, means for yieldingly resisting buffing forces applied to said car, and means in a different horizontal plane from the horizontal plane of said first named means for transmitting draft forces to said car, the operation of said buffing means being independent of said draft means.

15. A railway car comprising a center member extending substantially the length of the car, means in the plane of said center member for yieldingly resisting substantially all buffing forces applied to said car, and means for transmitting draft to said car, the operation of said first named means being independent of the operation of said last named means.

16. A railway car comprising means for yieldingly resisting approximately all buffing forces applied to said car, means for transmitting draft to said car, the operation of said first named means being independent of the operation of said last named means, and means for movably connecting said draft means to said first named means.

17. A railway car comprising long travel means for yieldingly resisting approximately all buffing forces applied to said car, means for transmitting draft to said car, the operation of said first named means being independent of the operation of said last named means, and means slidably connecting said second named means to said first named means.

18. In a car of the passenger train type, a body structure including body bolsters, a center member extending substantially the length of the car and mounted for longitudinal movement in both directions relative to said body bolsters, a face plate carried by said center member, means for resisting movement of the center member in either direction, and coupler means operatively connected to the center member.

19. In a passenger coach of the vestibule type, a body structure including body bolsters, a longitudinally movable center member extending substantially the length of the car and adapted for movement in both directions relative to said bolsters, a vestibule face plate carried by said center member, yielding means interposed between the face plate and the center member, coupler means operatively connected to said center member, means permitting movement of the coupler means in one direction only relative to said center member, and means for resisting movement of the center member in either direction relative to the body bolsters.

20. In a passenger car, a body structure including body bolsters, a longitudinal center member extending substantially the length of the body structure and mounted for movement in both directions relative to said bolsters, yielding draft and buffing means mounted in the plane of the center member for resisting movement of the latter in both directions, coupler means including a coupler and a resilient member operatively secured to the center member below the horizontal plane of the latter, said resilient member being adapted to resist movement of the coupler in one direction only relative to the center member, and a face plate pivotally secured to the center member.

21. In a passenger car, a body structure including body bolsters, a longitudinal center member mounted for movement in both directions relative to said body bolsters and extending beyond the opposite ends of the body structure, the ends of the center member being adapted to receive buffing forces, means for yieldingly resisting movement of the center member in both directions, and coupler means operatively secured to the center member.

22. In a passenger car, a body structure including body bolsters, a center member extending the length of the car and adapted for movement in both directions relative to the bolsters, said center member being adapted to directly receive buffing forces on the opposite ends thereof, yielding means for resisting said buffing forces and for resisting relative movement of the center member, coupler means positioned below the horizontal plane of the center member, and means for connecting the coupler means with the center member.

23. A passenger car comprising a body structure including body bolsters, a center member extending the length of the body structure and adapted for movement in both directions relative to said bolsters, a vestibule face plate pivotally connected to said center member, means for resisting relative movement of the center member in either direction, and coupler means operatively connected to the center member.

24. In a passenger car, the combination with the body structure including body bolsters, of a center member extending the length of the structure and adapted for movement in both directions relative to said bolsters, means resisting movement of the center member in both directions, a vestibule face plate, means for yieldingly and pivotally connecting said face plate to said center member, and coupler means connected to said center member, the coupler of said last named means being mounted below the horizontal plane of the center member.

25. In a passenger car, the combination with a body structure including body bolsters, of a center member extending the length of the car and adapted for long travel movement in both directions relative to said bolsters, energy dissipating means for resisting movement of the center member in both directions relative to the bolsters, a face plate slidably carried by said center member, resilient means interposed between said face plate and center member to resist relative movement therebetween, a coupler, means connecting said coupler to said center member, said coupler being adapted for movement from a normal position in one direction only relative to the center member, and yielding means for resisting movement of the coupler relative to the center member in said one direction.

26. In a passenger car of the type wherein a longitudinal center beam is mounted for movement of long travel relative to the bolsters of the car, and long travel yielding means are provided for resisting relative movement of the center beam in either direction, the combination with said member of a face plate carried thereby and mounted for movement relative thereto, yielding means for resisting movement of the plate relative to said beam, a coupler positioned below the horizontal plane of said beam, means operatively connecting said coupler and beam, and yielding means for resisting movement of the coupler relative to the beam in one direction.

27. In a car of the passenger train type, the combination with a body structure, of a center member extending substantially the length of the car and mounted for movement relative to said structure, said center member including a buffer beam, a face plate carried by said beam, means for yieldingly resisting movement of said center member, and couplers operatively connected to said center member.

28. In a car of the passenger train type, the combination with a body structure, of a long travel center member mounted for movement relative to said structure, said member including a buffer beam, a face plate carried by the center member, guiding means for said beam carried by said structure, means for yieldingly resisting movement of said center member, and couplers operatively connected to said center member.

29. In a car of the passenger train type, the combination with a body structure, of a long travel center member mounted for movement relative to said structure, said member including a buffer beam and a face plate, guiding means for the center member carried by said structure, energy dissipating means for resisting movement of the center member in both directions, and couplers operatively connected to said center member.

30. In a railway car, a draft and buffing member extending substantially the length of the car, means movably secured to said member for coupling said car to another car of a train, means movably carried by said member for receiving buffing forces, the extent of movement of said last named means relative to the draft and buffing member, with the car coupled to another car, determining the train slack between said cars, said last named means embodying a face plate.

31. In a railway car, a center member extending substantially the length of the car and mounted for movement relative thereto, means operatively connected to said center member for coupling said car to another car of a train, and yielding means movably mounted on said center member, said yielding means being mounted in a different horizontal plane from said coupling means, the movement of said yielding means relative to the center member, with the car coupled to another car, determining the train slack between said cars.

In testimony whereof I have signed this specification.

OTHO C. DURYEA.